United States Patent [19]

Teraoka

[11] Patent Number: 4,886,152
[45] Date of Patent: Dec. 12, 1989

[54] POWER TRANSMISSION UNIT
[75] Inventor: Masao Teraoka, Omiyamachi, Japan
[73] Assignee: Tochigifujisangyo Kabushiki Kaisha, Tochigi, Japan
[21] Appl. No.: 244,054
[22] Filed: Sep. 13, 1988

Related U.S. Application Data

[63] Continuation-in-part of Ser. No. 24,617, Mar. 11, 1987, abandoned.

[30] Foreign Application Priority Data

Mar. 14, 1986 [JP] Japan .................................. 61-36236

[51] Int. Cl.$^4$ ............................................. F16D 35/00
[52] U.S. Cl. ................................ 192/58 B; 192/112; 192/113 B; 74/467; 184/6.12
[58] Field of Search .................. 192/58 R, 58 A, 58 B, 192/110 B, 112, 113 R, 113 B; 180/237; 74/467, 711; 184/6.12; 464/7

[56] References Cited

U.S. PATENT DOCUMENTS 3,385,408  5/1968  Manning ............................ 192/58 C
4,534,456  8/1985  Slezak .............................. 192/58 A

FOREIGN PATENT DOCUMENTS 61-157439  7/1986  Japan .................................. 180/233
62-163829  7/1987  Japan .
    4654  8/1986  World Int. Prop. O. ........ 192/58 B

OTHER PUBLICATIONS

"Volkswagen 4x4 Transporter Synchro", 4x4 Magazine, Sep. 85, p. 52ff.

Primary Examiner—Leslie A. Braun
Assistant Examiner—David A. Testardi
Attorney, Agent, or Firm—Samuels, Gauthier, Stevens & Kehoe

[57] ABSTRACT

A power transmission apparatus comprises first and second rotary devices rotatable with respect to each other, a resistance device transmitting power between the first and second rotary devices by the viscous resistance of a viscous fluid, and a device for externally emitting heat generated between the resistance device and the viscous fluid through a lubricant flowing through the connecting portion between the first and second rotary devices.

3 Claims, 4 Drawing Sheets

POWER TRANSMISSION UNIT

RELATED APPLICATION

This application is a continuation-in-part of our prior copending application for U.S. Patent entitled "POWER TRANSMISSION UNIT" which was filed Nov. 3, 1987 and which bears Ser. No. 07/024,617 now abandoned.

BACKGROUND OF THE INVENTION

1. Field of the Invention

The present invention relates to an improvement of a power transmission unit, and particularly to a power transmission unit connected to a gear box such as a differential gear of a four-wheel drive vehicle.

2. Description of the Prior Art

Generally, front wheels of a four-wheel drive vehicle are driven directly by a driving source while rear wheels thereof are driven via a power transmission unit utilizing the so-called viscous coupling which transmits power by the viscous resistance of fluid.

The viscous coupling transmits very small torque when a rotational difference between an input shaft and an output shaft is small, while it transmits very large torque when the rotational difference is large.

FIG. 1 shows an example of the viscous coupling adapted for a power transmission unit according to the prior art.

In this figure, an input side of the coupling is on the right-hand side, and an output side thereof on the left-hand side. A flange yoke 101 connected to a propeller shaft on the input side is fixed to an input shaft 103 by bolts 105. Engaged with the periphery of the input shaft 103 is an end of an outer cylinder 107 which is fixed thereto solidly by welding, etc.

On the inner surface of the outer cylinder 107, there are provided a plurality of grooves 109 (for instance, grooves for a spline joint) in parallel with an axis of the outer cylinder 107. Engaged with the grooves 109 are teeth 113 of input plates 111 acting as resistance plates The teeth 113 (for instance, teeth for the spline joint) are formed on the periphery of each of the input plates 111 to engage with the grooves 109 provided for the outer cylinder 107 such that the input plates 111 do not rotate with respect to the outer cylinder 107. The inner diameter of each input plate 111 is formed slightly greater than the circumference of a sleeve 117 engaged with an output shaft 115 such that the input plate 111 does not interfere with the periphery of the sleeve 117.

The input plates 111 mentioned above and output plates 119 to be described later are arranged alternately one after another and spaced apart from each other by a predetermined distance "f". At an end of the combination of the input plates 111 and the output plates 119, there is disposed a flange 121 which is engaged with the outer cylinder 107. A stopper 123 is arranged on the inner surface of the outer cylinder 107 to stop the axial movement of the flange 121. The input shaft 103, outer cylinder 107, and flange 121 constitute an input member. The input member is rotatably supported by a ball bearing 125 and a roller bearing 127 with respect to the sleeve 117 engaged with the output shaft 115 solidly. To prevent the leakage of viscous fluid filled in a working chamber 129 accommodating the resistance plates 111 and 119, and to prevent the leakage of lubricant such as grease filled in the bearings, various seal members 131, 133, and 135 are assembled to the input shaft 103 and flange 121.

On the output shaft side, the periphery of the sleeve 117 engaging with the output shaft 115 (partly shown in the figure) is provided with a plurality of grooves 137 (for instance, grooves for a spline joint) which extend in parallel with an axis of the output shaft 115. The grooves 137 are arranged in a range corresponding to a range in which the grooves 109 of the outer cylinder 107 are disposed. Engaged with the grooves 137 are teeth 139 of the output plates 119 acting as the resistance plates. The teeth 139 (for instance, teeth for the spline joint) are formed on an inner diametral portion of each of the output plates 119. The periphery of the output plate 119 is formed slightly smaller than the inner diameter of the outer cylinder 107 of the input member such that the output plate 119 does not interfere with the outer cylinder 107.

The output plates 119 and the input plates 111 are arranged alternately one after another and spaced from one another by a distance "f".

The working chamber 129 is sealed by the seal members 131 and 135 filled with viscous fluid having high viscosity. The viscous fluid fills the respective gaps "f" between the input and output plates.

The viscous coupling with the above arrangement is adapted as a power transmission unit and disposed between the input propeller shaft and the differential unit for rear wheels to connect them with each other. A drive pinion disposed at an end of the output shaft 115 is connected to a ring gear of the differential unit for rear wheels. At an opening 143 of a housing 141 of the differential unit for rear wheels, there is fitted a seal member 145 which is arranged slidably around the output shaft 115 to prevent the leakage of the lubricant filled in the housing 141 of the differential unit for the rear wheels.

According to the above-mentioned power transmission unit, the input plates 111 arranged for the input shaft 103 transmit power to the output plates 119 through the viscous fluid of high viscosity sealed in the working chamber 129. Accordingly, slippage is caused between the plates and the viscous fluid, heating the viscous fluid.

The generated heat is dispersed to the atmosphere and cooled thereby because the power transmission unit is arranged outside the carrier 141. However, the bearings 125 and 127 and the seal members 131 and 133 arranged on the right and left sides to rotatably support the input member with respect to the output shaft 115 may be deteriorated quickly and cause insufficient lubrication because the heat generated as mentioned above may adversely affect lubricant such as grease filled in the bearings and the seal members. It may be possible to refill the grease if the grease is deteriorated, but it will be a bothersome work.

FIG. 2 shows another example of a power transmission unit according to a prior art ("4×4 Magazine", Sept., 1985, page 54, Four by Four Magazine Co.). Since the constitution of a viscous coupling shown in FIG. 2 is the same as that of the one shown in FIG. 1, the explanation thereof will be omitted. In this example, a viscous coupling 205 is assembled in a housing 203 of a differential unit 201 for front wheels. Power is transmitted from an input shaft 207 through resistance plates 209 to an output shaft 211, and, through a ring gear 215 engaging with a drive pinion 213 disposed at an end of the output shaft 211, the differential unit 201 for front wheels is rotated to turn left and right wheel shafts.

According to the above arrangement, respective rotating portions are lubricated by lubricant filled in the housing 203 so that the above-mentioned problem may not be caused. However, heat generated between the output and input resistance plates 209 of the viscous coupling 205 is cooled by the lubricant in the housing 203 of the differential unit 201 for the front wheels. Therefore, heat discharge is not sufficient, causing the heat not to be cooled but stored. As a result, the performance of the transmission unit is unstable, and the sufficient performance is not realized.

SUMMARY OF THE INVENTION

In view of the above problems, an object of the present invention is to provide a power transmission unit which is able to effectively discharge heat caused by slippage between resistance plates and viscous fluid, and realizes to lubricate rotating portions by utilizing lubricant in a gear box disposed in the vicinity of the power transmission unit.

In order to accomplish the objects and advantages mentioned in the above, the present invention provides a power transmission apparatus comprising: first rotary shaft means protruding from within a gear box; second rotary shaft means coaxially disposed with the first rotary shaft means, said first and second rotary shaft means being rotatable with respect to each other; a plurality of resistance plates alternately fixed with respect to the first and second rotary shaft means in the rotational direction; means defining a working chamber hermetically enclosing the plurality of the resistance plates and filled with a viscous fluid, said working chamber being disposed outside the gear box, said plurality of the resistance plates being operative to transmit power between the first and second rotary shaft means by the viscous resistance of the viscous fluid contained in said working chamber; a seal member disposed between the gear box and the outside of the second rotary shaft means and sealing a clearance formed therebetween; and emitting means for externally emitting heat generated between the resistance plates and the viscous fluid through a flow of lubricant, said emitting means having a first passage for said lubricant axially extending through the first rotary shaft means, a second passage for said lubricant axially disposed between the first rotary shaft means and a sleeve spline-engaged with the first rotary shaft means, and connecting means for interconnecting said first and second passages in a manner permitting said liquid lubricant to circulate therethrough.

BRIEF DESCRIPTION OF THE DRAWINGS

The other objects, features and advantages of the present invention will become apparent from the following descriptions of the preferred embodiments taken in conjunction with the accompanying drawings in which.

DETAILED DESCRIPTION OF THE PREFERRED EMBODIMENTS

The preferred embodiments of the present invention will now be described with reference to FIGS. 3 and 4.

Figure 1:
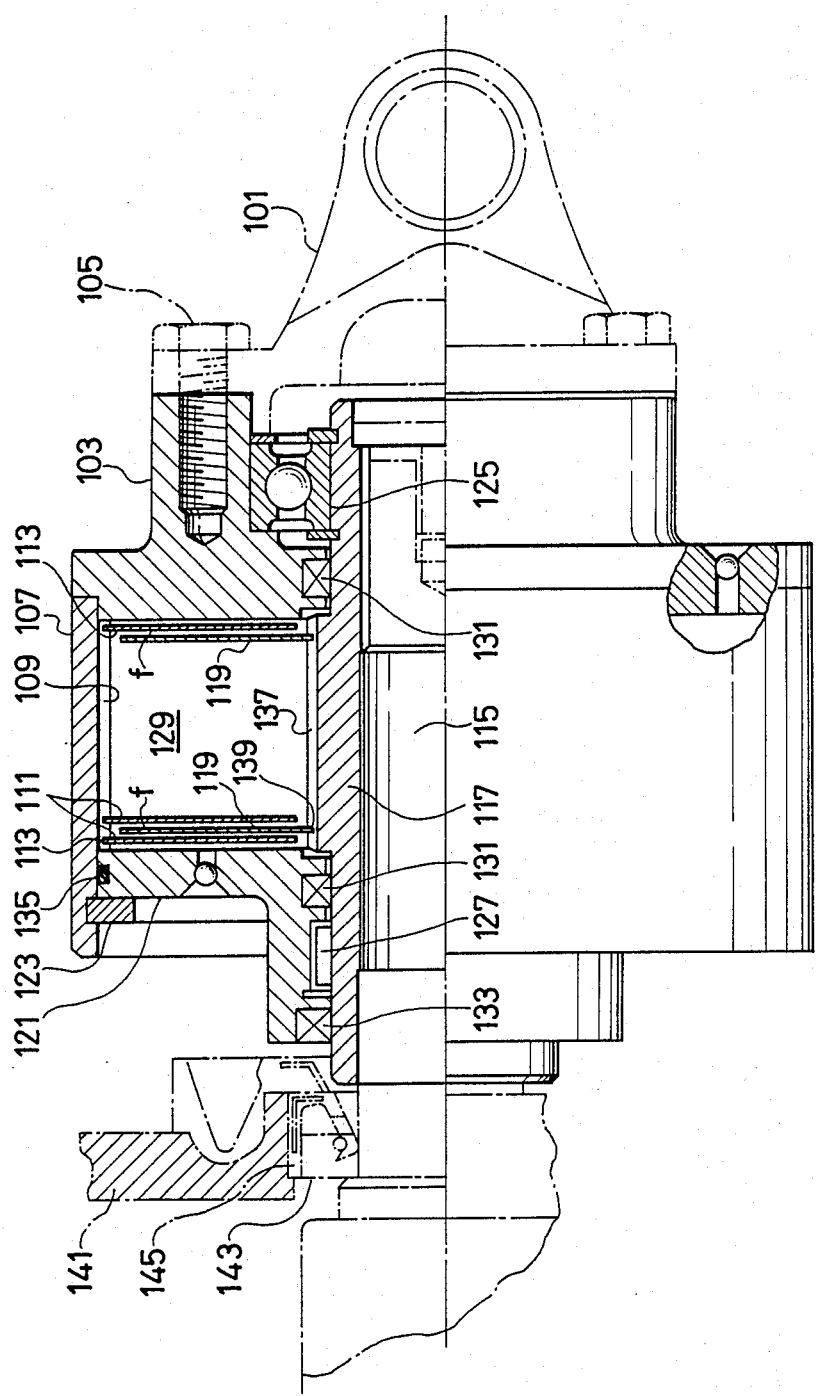
FIG. 1 is a cross-sectional view showing an example of a power transmission unit according to a prior art.
Figure 2:
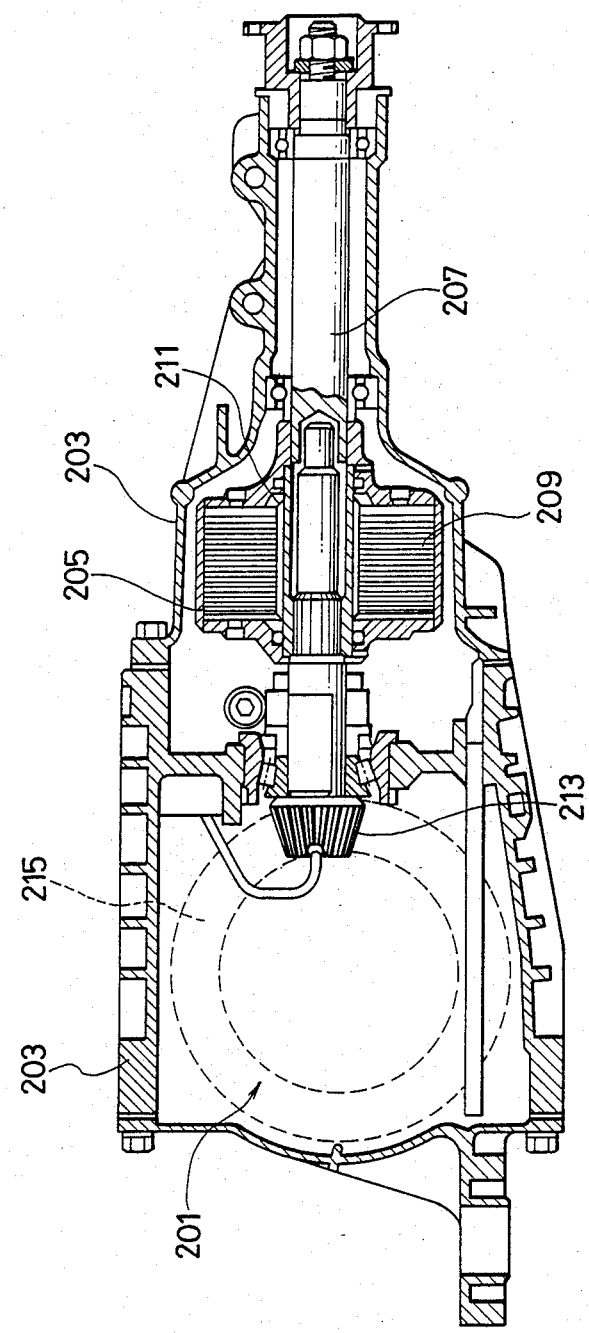
FIG. 2 is a cross-sectional view showing another example of the power transmission unit according to the prior art.
Figure 3:
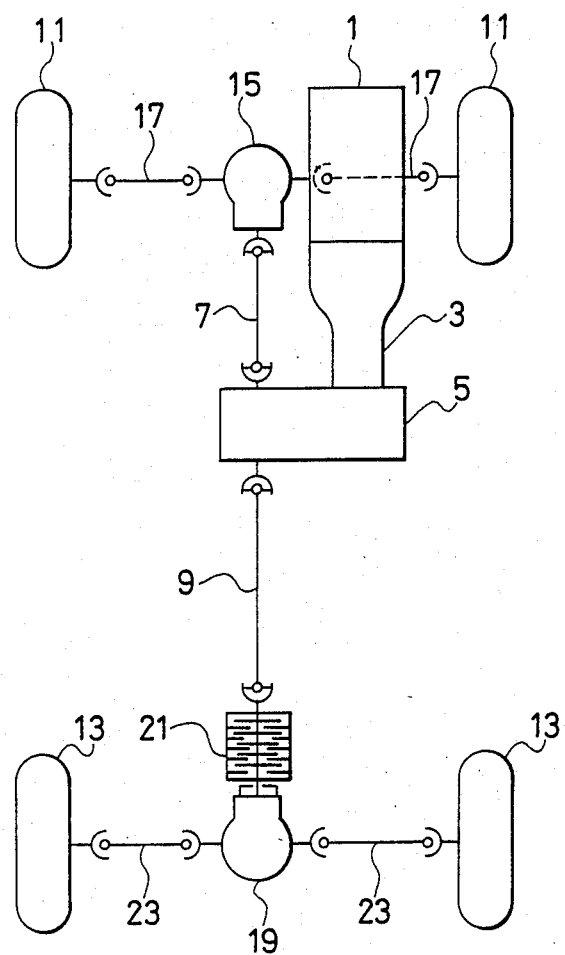
FIG. 3 is a schematic view showing a four-wheel drive vehicle having a power transmission unit according to the present invention.

FIG. 3 is a schematic view showing a power transmission portion of a four-wheel drive vehicle as well as showing an arrangement of an embodiment of a power transmission unit according to the present invention. Torque generated by an engine 1 is transmitted via a transmission 3 to a transfer case 5 from which the torque is divided into two portions, which are transmitted to front wheels 11 and rear wheels 13 via propeller shafts 7 and 9 respectively. The front wheels 11 are driven by the torque through the front wheel propeller shaft 7, a front wheel differential unit 15, and left and right front wheel axles 17.

In a driving system of the rear wheels 13, there is provided a viscous coupling 21 which is disposed between the rear wheel propeller shaft 9 and a rear wheel differential unit 19 and acts as a power transmission unit. The torque is transmitted to the rear wheel differential unit 19 through the rear wheel propeller shaft 9 and the viscous coupling 21 to drive the rear wheels 13 via rear wheel axles 23.

The characteristic of the viscous coupling 21 is that it transmits small torque when a small rotational difference is caused between an input shaft and an output shaft thereof, and large torque when the rotational difference is large.

Figure 4:
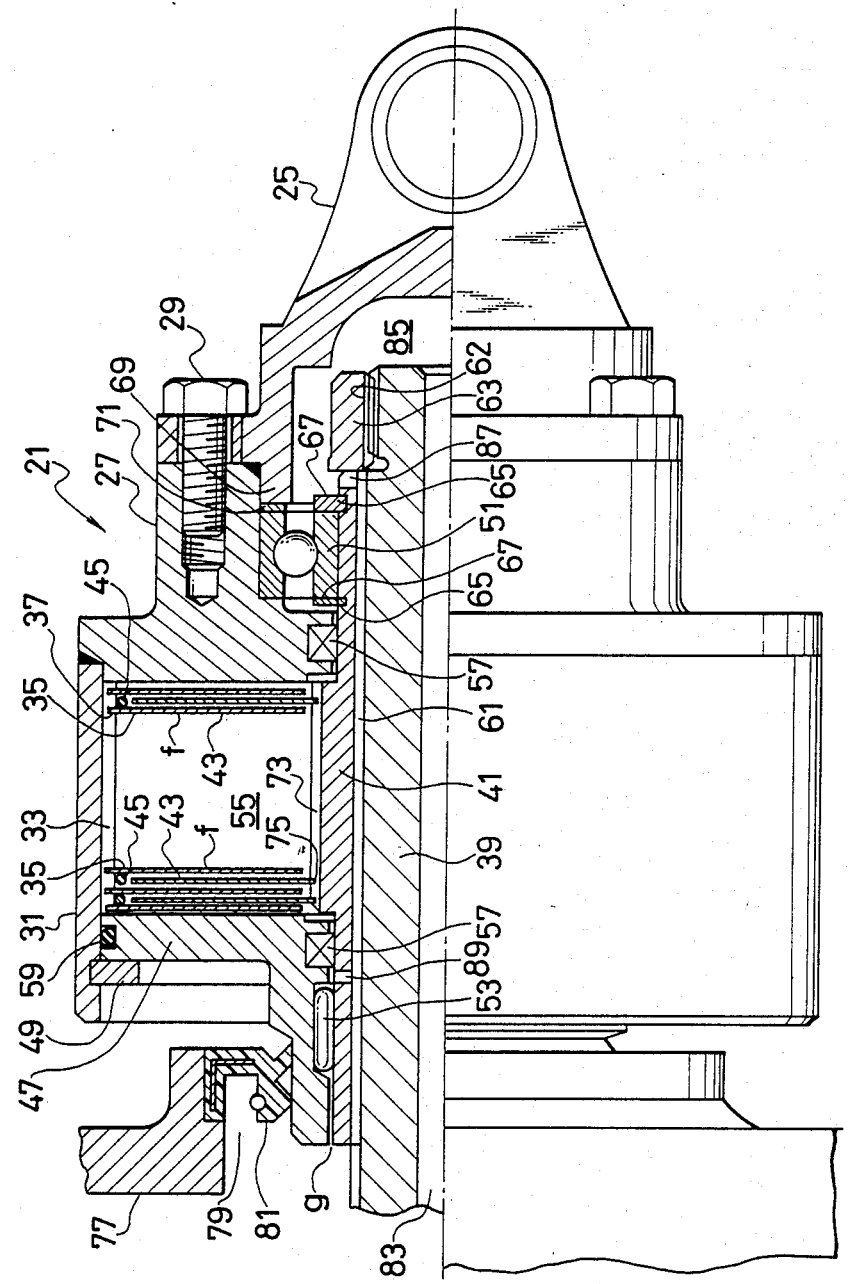
FIG. 4 is a cross-sectional view showing a viscous coupling of the power transmission unit according to the present invention.

FIG. 4 is a detailed cross-sectional view showing a part of the viscous coupling. In the figure, an input side of the viscous coupling is on the right-hand side, and an output side thereof on the left-hand side.

A flange yoke 25 connected to the rear wheel propeller shaft 9 is fixed to an input shaft 27 by bolts 29. The periphery of the input shaft 27 is engaged with an end of an outer cylinder 31, the connecting part thereof of them being fixed solidly by welding, etc. The flange yoke 25, the input shaft 27, the outer cylinder 31, and a flange 47 to be described later constitute a second rotary shaft disposed coaxially with respect to a first rotary shaft to be described later.

On the inner surface of the outer cylinder 31, there are provided a plurality of grooves 33 (for instance, grooves for a spline joint) in parallel with an axis of the outer cylinder 31. Input plates 35 acting as resistance plates are engaged with the grooves 33 formed on the outer cylinder 31 through teeth 37 (for instance, teeth for the spline joint) formed on the periphery of the input plates 35. The inner diameter of each of the input plates 35 is formed slightly larger than the circumference of a sleeve 41 engaged with an output shaft 39 to be described later such that the input plates 35 do not interfere with the sleeve 41.

A plurality of the input plates 35 and a plurality of output plates 43 to be described later are assembled alternately one after another. Adjacent input plates 35 are spaced from one another by a gap "f" which is maintained by positioning rings 45. The positioning rings 45 are inserted between respective adjacent input plates 35 in a manner that the positioning rings 45 do not interfere with the periphery of the respective output plates 43. At an end of the assembled resistance plates 35 and 43, there is disposed the flange 47 of the second rotary shaft. The flange 47 is engaged with the outer cylinder 31, and a stopper 49 is also engaged with the outer cylinder 31 to prevent the flange 47 from dropping.

The second rotary shaft members including the input shaft 27 and flange 47 are rotatably supported by a ball bearing 51 and a needle roller bearing 53 with respect to the sleeve 41 solidly engaged with the output shaft 39 which is the first rotary shaft. The resistance plates 35 and 43 are assembled in a working chamber 55 which is filled with viscous fluid. To prevent the leakage of the viscous fluid, there are provided seal members 57 and 59 for the input shaft 27 and the flange 47.

The output shaft 39 (partly shown in the figure) which is the first rotary shaft extends from the inside of a housing 77 which is a gear box. A lubricant supply passage 83 is formed at the axial center of the output shaft 39. The sleeve 41 is engaged with the output shaft 39 through a spline 61 and fixed by a nut 63 which is screwed into a threaded portion 62 formed at an end of the output shaft 39. The sleeve 41 supports the input shaft members through the barrel ball 51 and the needle roller bearing 53 disposed in the vicinity of the opposite ends of the sleeve 41.

The ball bearing 51 is prevented from moving in the axial direction by a stopper plate 67 fitted in an annular groove 65 of the sleeve 41. Between an end face of an outer ring of the barrel bearing 51 and an engaging portion 69 of the flange yoke 25, there is inserted an adjusting ring 71 for axial positioning.

On the periphery of the sleeve 41, there are formed a plurality of grooves 73 (for instance, grooves for a spline joint) extending in parallel with an axis of the sleeve 41. The grooves 73 are formed in a range corresponding to a range in which the grooves 33 are formed on the outer cylinder 31. The output plates 43 acting as the resistance plates are engaged with the grooves 73 through teeth 75 (for instance, teeth for the spline joint) which are formed on the inner surfaces of the output plates 43. The outer diameter of each of the output plates 43 is formed smaller than the inner diameter of the positioning ring 45 of the input plate 35 such that the outer plate 43 does not interfere with the positioning ring 45. The output plates 43 and the input plates 35 are assembled alternately one after another.

The seal members 57 and 59 seal airtightly the working chamber 55 which is filled with viscous fluid having high viscosity. The viscous fluid fills the gaps between the input and output plates 35 and 43. The viscous fluid may be silicon oil.

The viscous coupling with the above-mentioned arrangement acts as a power transmission unit and is connected between the rear wheel propeller shaft and the differential. A drive pinion fitted to an end (not shown) of the output shaft 39 meshes with a ring gear of the rear wheel differential unit. A seal member 81 disposed at an opening 79 of the housing 77 of the rear wheel differential unit abuts against the vicinity of an end of the flange 47 of the second rotary shaft which is a member of the viscous coupling 21, to prevent lubricant filled in the housing 77 of the differential from leaking.

A lubricant supply system for the bearings 51 and 53 will be described. The output shaft 39 has the passage 83 for supplying lubricant such that the lubricant filled in the housing 77 of the rear wheel differential unit 19 can reach the bearing 51 through the passage 83. The lubricant passes through the passage 83 and a cavity 85 formed in the flange yoke 25 and is fed to the ball bearing 51. As a circulation passage for the lubricant, one of the teeth of the spline 61 provided for the sleeve 41 is cut off, and a hole 87 communicating with the cut-off tooth is formed at an end of the sleeve 41. The lubricant passes through the hole 87 and the cut-off tooth, and is returned into the housing 77. Therefore, fresh lubricant is always supplied to the ball bearing 51.

The needle roller bearing 53 is assembled in the flange 47 which is one of the input shaft members. Between an inner diametral portion of an end of the flange 47 and an outer diametral portion of the sleeve 41 engaged with the output shaft 39, there is maintained a slight gap "g". The lubricant filled in the housing 77 of the rear wheel differential unit 19 passes through the gap "g" and is supplied to the needle roller bearing 53. Between the needle roller bearing 53 and the seal member 57 and at a position corresponding to the position of the cut-off teeth of the sleeve 41, there is formed a hole 89 through which the lubricant is circulated via the cut-off teeth. Therefore, fresh lubricant is always supplied to the needle roller bearing 53.

Further, the lubricant is supplied to the surfaces of the seal member 57.

According to the above arrangement, torque is transmitted to the input shaft 27 which rotates the input plates 35. The torque is transmitted from the input plates 35 to the output plate 43 through the viscous fluid filled in the gaps between the input plates 35 and the output plates 43 by frictional force caused between them.

At this time, heat generated by the frictional force between the resistance plates is dispersed to the atmosphere and not stored. The bearings for supporting the input shaft members and the seal members are always supplied with lubricant so that the lubricant may not be deteriorated and may not be in short supply. As a result, smooth rotation can be maintained.

Although the viscous coupling is disposed in front of the rear wheel differential unit in the above embodiment, it may be arranged on the side of a gear box of, for instance, the front wheel differential unit or the transfer unit.

According to the power transmission unit of the present invention, heat generated by friction between the resistance plates is dispersed to the atmosphere so that the viscosity of the viscous fluid will not be deteriorated. Further, the lubricant filled in the adjacent gear box is always supplied to the rotating portions between the first rotary shaft and the second rotary shaft so that the bearings and the seal members may have long service lives, increasing the reliability of the unit and secure the safety driving.

While the embodiments of the present invention, as herein disclosed, constitute a preferred form, it is to be understood that other forms might be adopted.

What is claimed is:

1. A power transmission apparatus comprising:
   first rotary shaft means protruding from within a gear box;
   second rotary shaft means coaxially disposed with the first rotary shaft means, said first and second rotary shaft means being rotatable with respect to each other;
   a plurality of resistance plates alternately fixed with respect to the first and second rotary shaft means in the rotational direction;
   means defining a working chamber hermetically enclosing the plurality of the resistance plates and filled with a viscous fluid, said working chamber being disposed outside the gear box, said plurality of the resistance plates being operative to transmit power between the first and second rotary shaft means by the viscous resistance of the viscous fluid contained in said working chamber;

a seal member disposed between the gear box and the outside of the second rotary shaft means and sealing a clearance formed therebetween; and emitting means for externally emitting heat generated between the resistance plates and the viscous fluid through a flow of liquid lubricant, said emitting means having a first passage for said lubricant axially extending through the first rotary shaft means, a second passage for said lubricant axially disposed between the first rotary shaft means and a sleeve spline-engaged with the first rotary shaft means, and connecting means for interconnecting said first and second passages in a manner permitting said liquid lubricant to circulate therethrough.

2. The power transmission of claim 1 wherein said liquid lubricant is contained in said gear box, and said first and second passages communicate with said gear box to accommodate a circulating flow of said liquid lubricant from and back to said gear box.

3. The power transmission apparatus of claim 2 wherein said second rotary shaft means is carried on said first rotary shaft means by bearings interposed therebetween, said connecting means being positioned to expose said bearings to the liquid lubricant circulating through said first and second passages from and back to said gear box.

* * * * *